US011762890B2

(12) United States Patent
Filoti et al.

(10) Patent No.: US 11,762,890 B2
(45) Date of Patent: Sep. 19, 2023

(54) FRAMEWORK FOR ANALYZING TABLE DATA BY QUESTION ANSWERING SYSTEMS

(71) Applicant: INTERNATIONAL BUSINESS MACHINES CORPORATION, Armonk, NY (US)

(72) Inventors: Octavian F. Filoti, Portsmouth, NH (US); Christopher M. Nolan, Acton, MA (US); Chengmin Ding, Chantilly, VA (US); Renee F. Decker, Bunswick, MD (US); Elinna Shek, Loudoun County, VA (US); Stanley J. Vernier, Grove City, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 922 days.

(21) Appl. No.: 16/146,698

(22) Filed: Sep. 28, 2018

(65) Prior Publication Data
US 2020/0104414 A1 Apr. 2, 2020

(51) Int. Cl.
*G06F 16/31* (2019.01)
*G06N 5/00* (2023.01)
*G06F 16/22* (2019.01)
*G06F 16/2452* (2019.01)
*G06F 40/169* (2020.01)
*G06F 40/177* (2020.01)

(52) U.S. Cl.
CPC ........ *G06F 16/316* (2019.01); *G06F 16/2282* (2019.01); *G06F 16/24522* (2019.01); *G06F 40/169* (2020.01); *G06F 40/177* (2020.01); *G06N 5/00* (2013.01)

(58) Field of Classification Search
CPC .............. G06F 16/316; G06F 16/2282; G06F 16/24522; G06F 40/169; G06F 40/177; G06N 5/00
See application file for complete search history.

(56) References Cited

U.S. PATENT DOCUMENTS 7,054,871 B2  5/2006  Hu et al.
7,792,829 B2  9/2010  Brill
(Continued)

OTHER PUBLICATIONS

David Pinto, Andrew McCallum, Xing Wei, and W. Bruce Croft, "Table extraction using conditional random fields," In Proceedings of the 26th annual international ACM SIGIR conference on Research and development in information retrieval, pp. 235-242. ACM, 2003.
(Continued)

*Primary Examiner* — Mark D Featherstone
*Assistant Examiner* — Ranjit P Doraiswamy
(74) *Attorney, Agent, or Firm* — Conley Rose, P.C.

(57) ABSTRACT

A question answering (QA) system comprising memory for storing instructions, and a processor configured to execute the instructions to ingest source documents that include structured data and unstructured data to create a knowledge base, wherein the unstructured data includes table data; create table annotations to represent the table data; store the ingested structured data, unstructured data, and the table annotations in the knowledge base; and determine answers to questions using the knowledge base.

18 Claims, 9 Drawing Sheets

(56) References Cited

U.S. PATENT DOCUMENTS

| | | | |
|---|---|---|---|
| 8,914,419 | B2 | 12/2014 | Gerard et al. |
| 9,286,290 | B2* | 3/2016 | Allen .................. G06F 40/205 |
| 9,495,347 | B2 | 11/2016 | Stadermann et al. |
| 9,600,461 | B2 | 3/2017 | Byron et al. |
| 9,607,039 | B2 | 3/2017 | Byron et al. |
| 10,706,218 | B2* | 7/2020 | Milward ................ G06F 40/18 |
| 2003/0097384 | A1 | 5/2003 | Hu et al. |
| 2009/0076974 | A1* | 3/2009 | Berg .................... G06Q 40/06 |
| | | | 705/36 R |
| 2014/0122535 | A1 | 5/2014 | Gerard et al. |
| 2016/0019192 | A1 | 1/2016 | Crapo et al. |
| 2017/0060945 | A1 | 3/2017 | Bastide |
| 2019/0080006 | A1* | 3/2019 | Zoryn .................. G06F 16/951 |
| 2019/0205453 | A1* | 7/2019 | Miller ................ G06F 16/2282 |

OTHER PUBLICATIONS

Xing Wei, Bruce Croft, and Andrew McCallum, "Table extraction for answer retrieval," Information retrieval 9, No. 5 (2006): 589-611.

Zhang, "Towards Efficient and Effective Semantic Table Interpretation," International Semantic Web Conference, 2014, 16 pages.

Sujay Kumar Jauhar, Peter Turney, Eduard Hovy, "Tables as Semi-structured Knowledge for Question Answering," Proceedings of the 54 Annual Meeting of the Association for Computational Linguistics, vol. 1, https://aclanthology.org/P16-1045; Aug. 2016, 10 pages.

* cited by examiner

FRAMEWORK FOR ANALYZING TABLE DATA BY QUESTION ANSWERING SYSTEMS

BACKGROUND

A question answering (QA) system is a computer application which mines stored data in a knowledge base in order to answer questions. The present disclosure provides various embodiments for utilizing table data in a QA system such as, but not limited to, International Business Machines' (IBM) Watson® QA system.

SUMMARY

The disclosed embodiments include a system, computer program product, and computer-implemented method for utilizing table data in a QA system. As an example embodiment, a QA system is disclosed that includes memory for storing instructions, and a processor configured to execute the instructions to ingest source documents that include structured data and unstructured data to create a knowledge base, wherein the unstructured data includes table data; create table annotations to represent the table data; store the ingested structured data, unstructured data, and the table annotations in the knowledge base; and determine answers to questions using the knowledge base.

Another example embodiment is a computer program product for utilizing table data in a QA system. The computer program product comprising a computer readable storage medium having program instructions embodied therewith. The program instructions executable by a processor to cause the processor to: ingest source documents that include structured data and unstructured data to create a knowledge base, wherein the unstructured data includes table data; extract the table data found in the source documents; parse a table structure of a table that is part of the table data found in the source documents to identify table headers and content of table cells of the table; determine annotation types of the table headers; create table annotations to represent the table data by linking a table identifier of the table with a table column identifier associated with a table column of the table, an annotation type of a table header of the table column, a canonical name of the table header of the table column; and the content of the table cells of the table column; store the ingested structured data, unstructured data, and the table annotations in the knowledge base; and determine answers to questions using the knowledge base.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
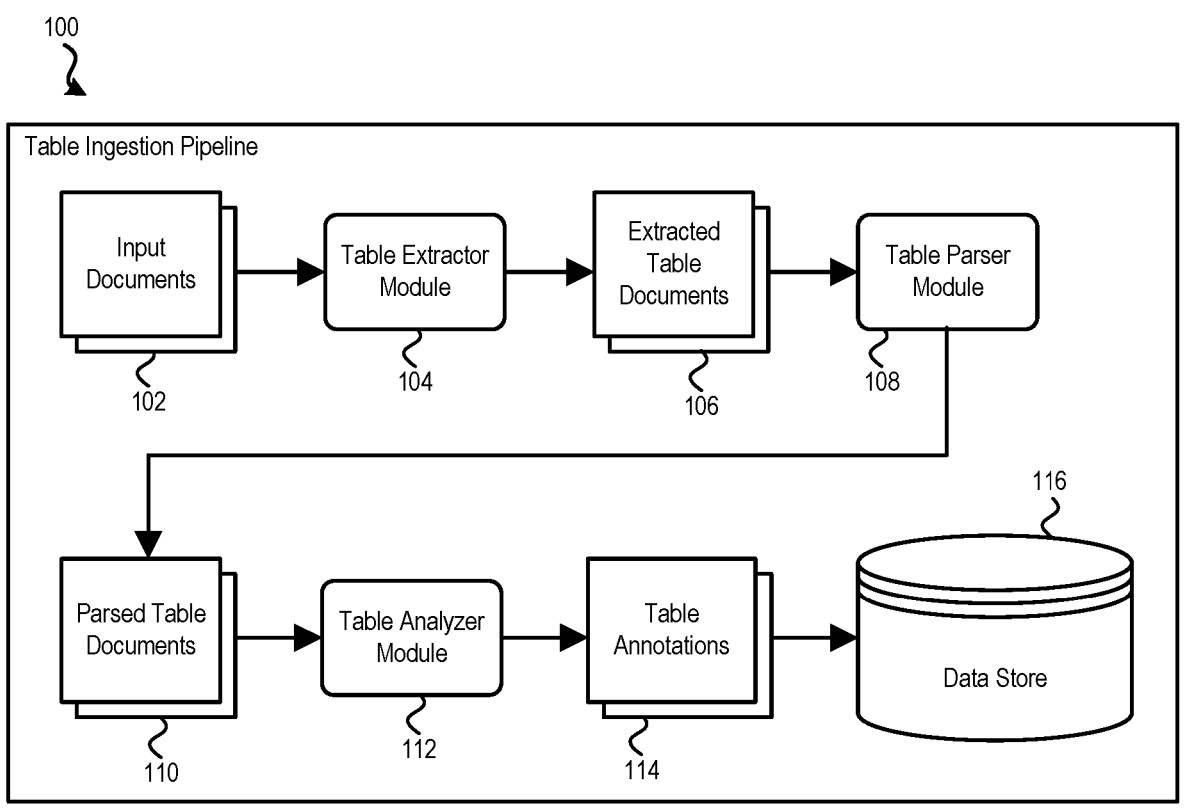
FIG. 1 is a schematic diagram illustrating a table ingestion pipeline that is configured to produce table annotations in accordance with an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicates" means capable of sending and/or receiving data over a communication link. The communication link may include both wired and wireless links, and may be a direct link or may comprise of multiple links passing through one or more communication networks or network devices such as, but not limited to, routers, firewalls, servers, and switches. The communication networks may be any type of wired or wireless network. The networks may include private networks and/or public networks such as the Internet. Additionally, in certain embodiments, the term communicates may also encompass internal communication between various components of a system and/or with an external input/output device such as a keyboard or display device.

The present disclosure relates generally to a QA system. Analyzing table data has been a challenge for QA systems. Table data is data that is organized in a table format, e.g., by rows and columns. There is abundance of structured information presented in a table form, as well as plenty of unstructured data that can be rendered in a table-like format. Being able to leverage table data in a domain where this type of data contains a lot of hidden insights (e.g. scientific domain or financial domain) will expand the capabilities of QA systems, enable discovery of facts from hidden context, and improve the accuracy of answers.

Accordingly, the disclosed embodiments seek to integrate table data into QA systems such that it makes table data as useful as general text for QA systems. The disclosed embodiments do not intend to simplify the table data analysis. Instead, the disclosed embodiments intend to extract as much contextual information as possible (both existent and hidden) to be able to directly or indirectly (i.e., infer) answers from the table data. For instance, in various embodiments, the disclosed embodiments expand the capabilities of a QA system beyond the quest that the answer has to be in its knowledge base. The disclosed embodiments also expand the answering domain to allow collective answers to be returned in the form of a list or table.

In accordance with an embodiment, table annotations are created that link the table headers (columns and/or rows) with their corresponding cells data. Additionally, semantic meanings are associated with the table annotations. At ingestion time, this linked table information, referred to herein as table annotations, is extracted and stored in either a search index or relational database collection, or both. The search index or relational database collection is then used by the QA system to retrieve table information for obtaining answers to a question. In various embodiments, the table data can be used independent of or together with the general text ingested data.

Advantages of the disclosed embodiments include, but are not limited to, more in-depth analysis of table information, enable discovery of facts, improve answer accuracy, the ability to analyze irregular and complex table shapes (e.g., periodic table), the ability to restructure table content (e.g., nested tables could be created separately while maintaining the link to the parent table), the ability to use surrounding text associated with the table data, and the ability to retrieve table data using multiple values, such as annotation type, canonical name, unit, and cell data, or any auxiliary metadata that was attached to the link. For example, because the table header (column or row) is linked to its cells data and semantic values, the disclosed embodiments can be expanded to answer more complex questions that may involve data from multiple cells of various rows and columns in a data table.

As will be further described herein, the present disclosure describes two innovative approaches for determining an answer using table data, a looping cells position mapping and folding method, and a curve fitting with graph axes intersection and folding method. The details of both methods are further described below.

FIG. 1 is a schematic diagram illustrating a table ingestion pipeline 100 that is configured to produce table annotations in accordance with an embodiment of the present disclosure. In one embodiment, the table ingestion pipeline 100 is a component of a larger ingestion pipeline as described in FIG. 4 that is configured to extract information from source documents to create a knowledge base that is used by QA systems to answers questions. The knowledge base may store complex structured and unstructured information. Structured information is data that has some form of organization, whereas unstructured information is unorganized information.

In an embodiment, the table ingestion pipeline 100 is specifically configured to extract table data and build the table annotations that are stored either in a search index or relational database collection. For example, in the depicted embodiment, the table ingestion pipeline 100 begins with a set of input documents 102. The set of input documents 102 includes any number of documents that may contain unstructured text and tables. The set of input documents 102 can include, but is not limited to, user created documents, online web pages gathered by a web crawler, table data, and data from other databases. The set of input documents 102 is received as input into a table extractor module 104. In one embodiment, the table extractor module 104 separates the tables in the set of input documents 102 to create extracted table documents 106 that contain only the tables from the set of input documents 102. In certain embodiments, if the set of input documents 102 contains only tables, the table extractor module 104 may be eliminated.

The extracted table documents 106 are inputted into a table parser module 108. The table parser module 108 parses the table structure and creates parsed table documents 110 that identify the table headers and their corresponding cells data. In one embodiment, the table parser module 108 discards extra attributes such as, but not limited to, formatting and style, and maintains only the table data of interest. In various embodiments, different table formats can be parsed and converted to a particular format such as, but not limited to, hypertext markup language (HTML) format. The table parser module 108 records the position of each cell in the table such as its rows and columns headers or other identifiers (IDs).

The parsed table documents 110 are passed to a table analyzer module 112. In one embodiment, the table analyzer module 112 is a natural language processing engine that is adapted for table analysis. For example, in one embodiment, the table analyzer module 112 performs natural language processing on the header and its cells data to identify the header's annotation type or category (e.g., Person, Organization, Date, Temperature), extract unit of measurement information if available, or determine any other semantic value that could be useful. In some embodiments, the table analyzer module 112 normalizes the header or cell data to a canonical form. The normalize form accounts for variations in the data such as plural/singular terms, past/present tense, misspellings, abbreviations, etc. The outcome of the table analyzer module 112 is table annotations 114, which contains a linkage of the header with all its corresponding cells data along with semantic values. Semantic values are the result of the table analyzer module performing its natural language process on each table cell data, and they could be the annotation types, categories or labeling for example. Besides the annotation types, the extra semantic values can make up the Auxiliary data 214 as described below. The table annotations 114 will be used by the QA system for answering questions in which the answer may be found directly or indirectly in the table data as further described herein.

The table annotations 114 are stored in a data store 116. A data store is a repository for persistently storing and managing collections of data. For example, in various embodiments, the data store 116 can be a search index or relational database collection. The data store 116 is part of the knowledge base of the QA system that contains the information or data that is available to the QA system for answering various questions.

Figure 2:
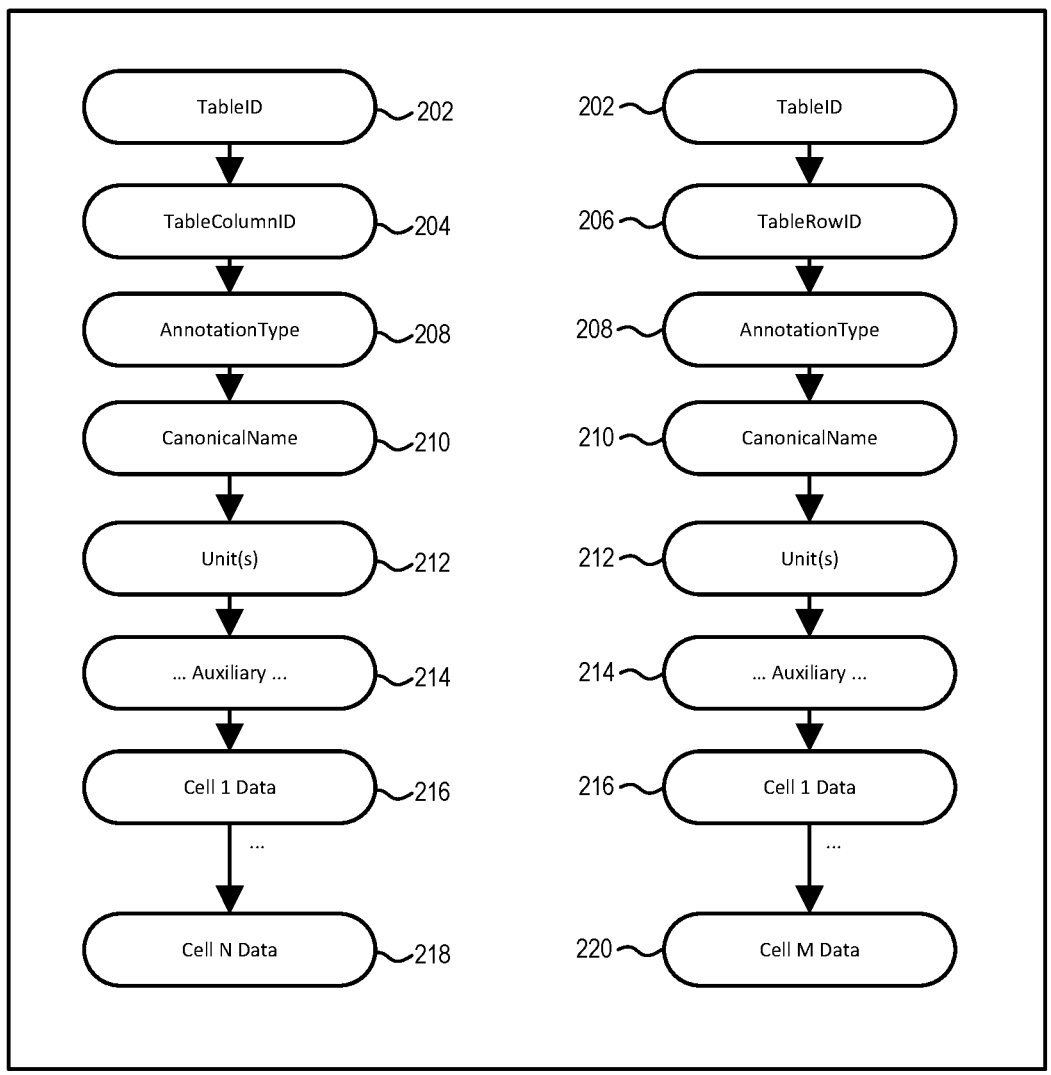
FIG. 2 is a schematic diagram illustrating a first representation of table annotations in accordance with an embodiment of the present disclosure.
Figure 3:
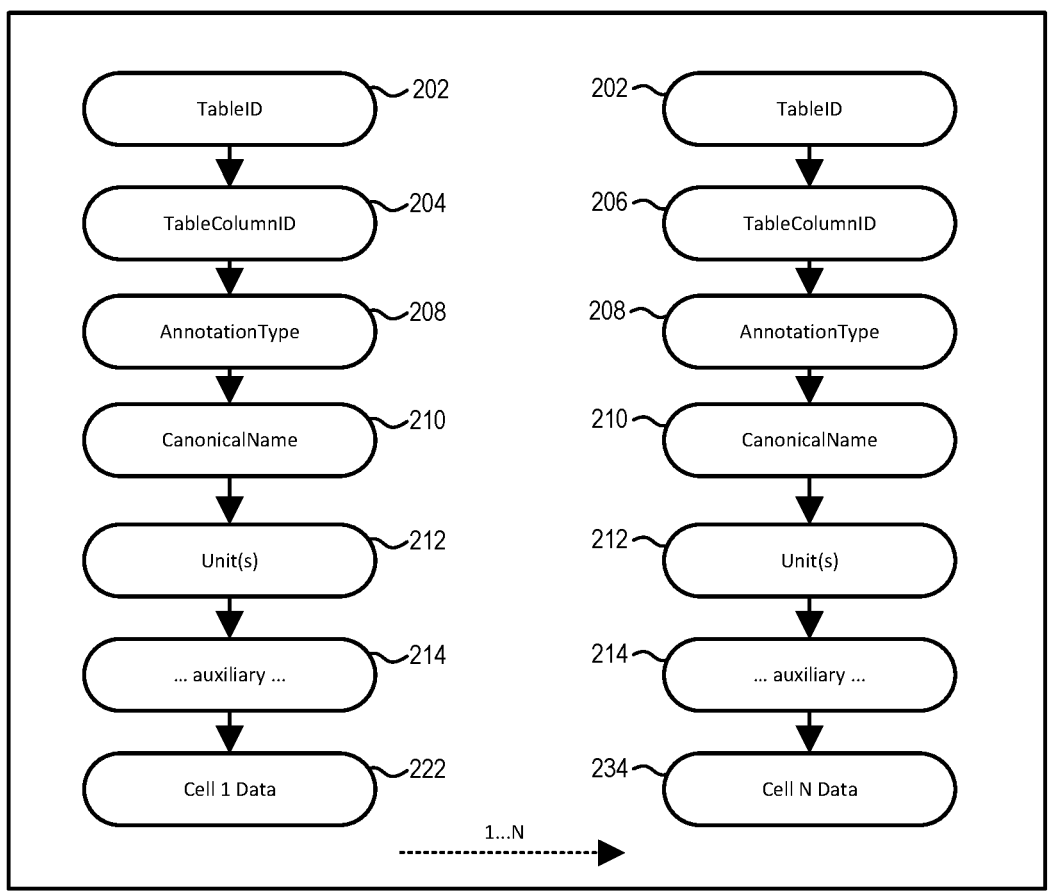
FIG. 3 is a schematic diagram illustrating a second representation of table annotations in accordance with an embodiment of the present disclosure.

FIG. 2 and FIG. 3 are schematic diagrams illustrating a first and second representation of table annotations in accordance with various embodiments of the present disclosure. The table annotations may be created using the table ingestion pipeline 100 described in FIG. 1. In various embodiments, the table annotations 200 depicted in FIG. 2 can be used for relational databases that have tables with N rows and M columns, and the table annotations 300 depicted in FIG. 3 can be used for a search index collection.

Referring to FIG. 2, the table annotations 200 links the table identifier (TableID) 202 with a table column ID (TableColumnID) 204. The TableID 202 is a unique identifier for the table. For example, the TableID 202 can be composed of document number, table name, and the table number within the document (if more than one table in a document). The TableColumnID 204 is a column normalized position (e.g., column position normalized to a position of a baseline column). Similarly, if the table has row headers, the table annotations 200 can link the TableID 202 with a table row ID (TableRowID) 206. The TableRowID 206 is a row normalized position. The TableColumnID 204 and/or the TableRowID 206 are linked to an annotation type (AnnotationType) 208. AnnotationType 208 is a description or semantic meaning of the column or row header. For example, depending on the natural processing engine used on the table, a semantic meaning is assigned to the column or row header, such as PERSON, ORGANIZATION, TIME, TEMPERATURE, etc.

The AnnotationType 208 is linked to a canonical name (CanonicalName) 210, which is a canonical form of the column or row header data. For example, in one embodiment, if the column or row header data is abbreviated or too complexed, then the header data is reduced or expanded to a canonical (normalized) form. The CanonicalName 210 is linked to Unit(s) 212. Unit(s) 212 indicates if there is a unit of measurement for that column or row. In one embodiment, if there is a unit of measurement for that column or row, then either a symbol or a normalized (canonical) form of the unit is shown. For example, if F is the unit, then either the symbol F is used or a canonical form such as Fahrenheit can be used. In some instances, there could also be multiple units used, such as F (C).

The Unit(s) 212 is linked to any auxiliary data 214 for the column/row of the table. Auxiliary data 214 may be any type of data that may assist in analyzing the table data. For example, auxiliary data 214 may include additional metadata or semantic meaning that helps in analyzing the table data. The auxiliary data 214 is linked to the cell data beginning with the data in cell 1 (Cell 1 Data) 216 through the data in cell N (Cell N Data) 218 for the corresponding column header, and through the data in cell M (Cell M Data) 220 for the corresponding row header.

As described above, the table annotations 200 depicted in FIG. 2 can be stored in a relational database collection, and used by the QA system to analyze table information.

Referring to FIG. 3, the table annotations 300 is similar to the table annotations 200 described above, except that it is optimized for use in a search index collection. In particular, the table annotations 300 links the TableID 202, TableColumnID 204, AnnotationType 208, CanonicalName 210, Unit(s) 212, and auxiliary data 214 with only one cell data (e.g., Cell 1 Data) 222. In the instance of a table that has N number of cells (cell N data 234), there will be n table annotations, one for each cell data. To obtain the data for a particular cell X, the QA system will loop through the search index X times to retrieve the desired cell data as further described below.

Figure 4:
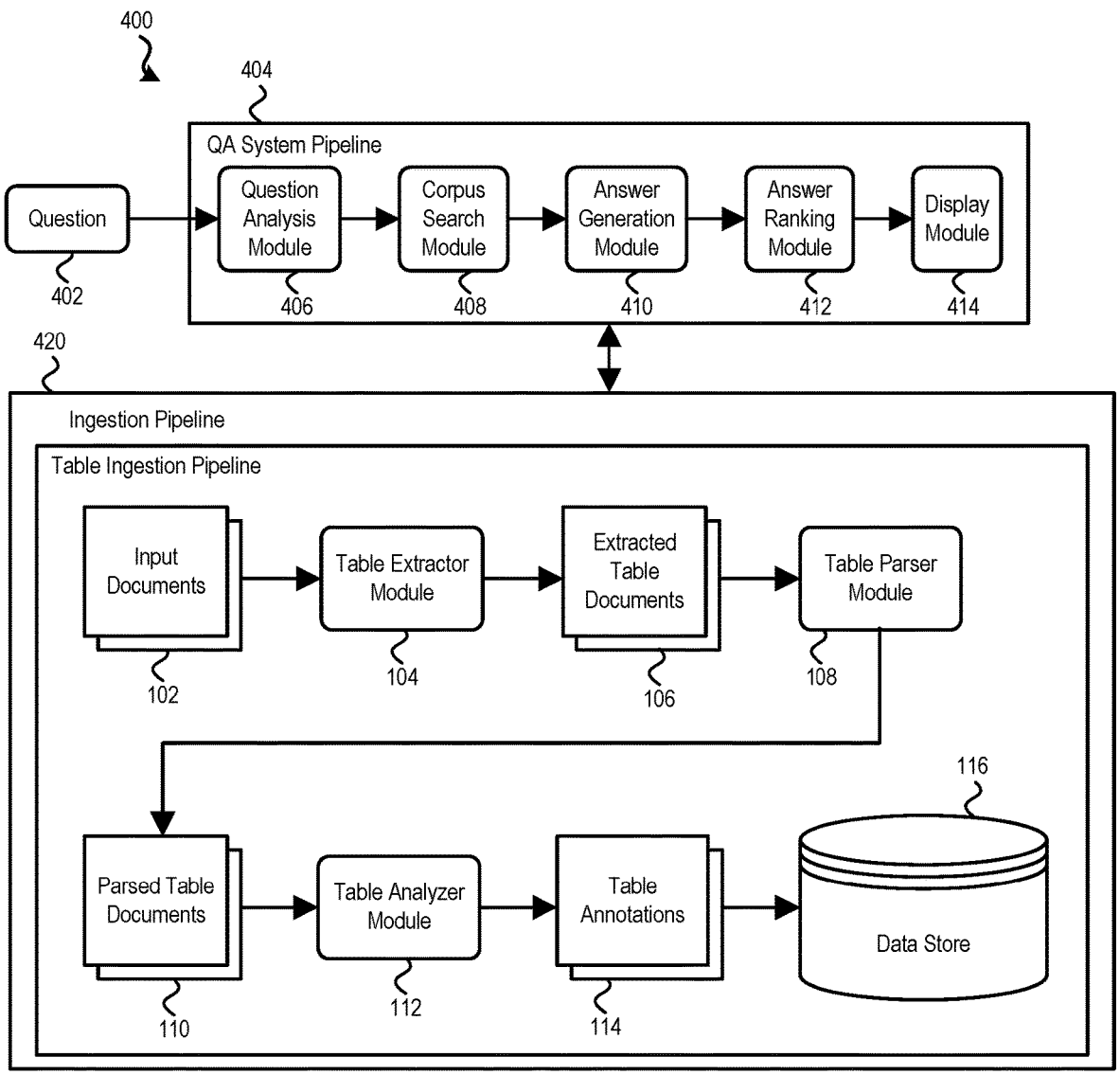
FIG. 4 is a schematic diagram illustrating QA system in accordance with an embodiment of the present disclosure.

FIG. 4 is a schematic diagram illustrating QA system 400 in accordance with an embodiment of the present disclosure. The QA system 400 includes a QA system pipeline 404 and an ingestion pipeline 420. The ingestion pipeline 420 is configured to create a knowledge base by extracting information from source documents. The source documents may include unstructured data (e.g., freeform text) and structured data such as table data. For instance, in accordance with the disclosed embodiments, part of the ingestion pipeline 420 is the table ingestion pipeline 100, which is configured to ingest table data in the source documents as described above in FIG. 1. The ingestion pipeline 420 and table ingestion pipeline 100 enables the QA system 400 to utilize both unstructured data along with structured data to answer various questions using the QA system pipeline 404.

The QA system pipeline 404 is a computer application that is configured to mine the knowledge base created by the ingestion pipeline 420 in order to provide an answer to a question 402. In the depicted embodiment, the QA system pipeline 404 includes a question analysis module 406, a corpus search module 408, an answer generation module 410, an answer ranking module 412, and a display module 414.

The question analysis module 406 can include instructions for performing natural language processing (NLP), decomposition, shallow parses, deep parses, logical forms, semantic role labels, coreference, relations (e.g., subject-verb-object predicates or semantic relationships between entities), named entities, and so on, as well as specific kinds of analysis for question classification such as extracting the keynote words from the question. NLP enables the QA system 400 to understand human speech. Question classification is the task of identifying question types or parts of questions that require special processing.

In an embodiment, the corpus search module 408 is configured to extract table annotations (e.g., annotation type, canonical name, or any auxiliary semantic value that was associated with the header or cell data) that correspond to the extracted keynote words or other data associated with the question 402. The corpus search module 408 uses the table annotations metadata and returns possible matches.

In an embodiment, assuming that at least two table annotations are returned by the corpus search module 408, the answer generation module 410 is configured to apply two methods to the table annotations to identify one or more possible/candidate answers. The first method is referred to herein as a looping cells position mapping and folding method. The looping cells position mapping and folding method brings together at least two table annotations to map the cell data to its position and then intersect it with the other to match the answer. In addition, the looping cells position mapping and folding method can be expanded as needed by folding in (i.e., adding) other table annotations one at a time to retrieve additional data for answering more complex questions. In some embodiments, the looping cells position mapping and folding method may use table annotations from more than one table. For example, one table may provide a list of the most traveled to city in the United States, while another table may identify tourist attractions for a particular city. Examples of the looping cells position mapping and folding method is further described below in reference to FIG. 5 and FIG. 6.

The second method is referred to herein as a curve fitting with graph axes intersection and folding method that can be used to infer the answer when no matching can be done at the cell level. For example, if there is no text mentioning that Barack Obama was president in 2011, but a table shows that he was president from 2008 to 2012, then the disclosed embodiments can correctly infer the answer by analyzing the table data using the curve fitting with graph axes intersection and folding method. An example of the curve fitting with graph axes intersection and folding method is further described below in reference to FIG. 7.

Once the answer generation module 410 identifies one or more candidate answers, the answer ranking module 412 is configured to rank the one or more candidate answers. The answer ranking module 412 may rank the candidate answers based on a plurality of scores associated with each candidate answer. For example, IBM® Watson® employs more than 50 scoring components that produce scores ranging from formal probabilities to counts to categorical features, based on evidence from different types of sources including unstructured text, semistructured text, and triple stores. These scorers consider various factors including, but not limited to, the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), and its aliases. Based on the rankings, the answer ranking module 412 can be configured to identify a single best-candidate answer to generate an answer to the question 402. In one embodiment, the answer ranking module 412 may be configured to provide an estimate of its confidence (e.g., a confidence score/percentage) that the answer is correct.

The display module 414 is configured to display the answer, and optionally the confidence score. In some embodiments, the display module 414 can convert the answer to speech for providing a verbal answer to the question 402.

Figure 5:
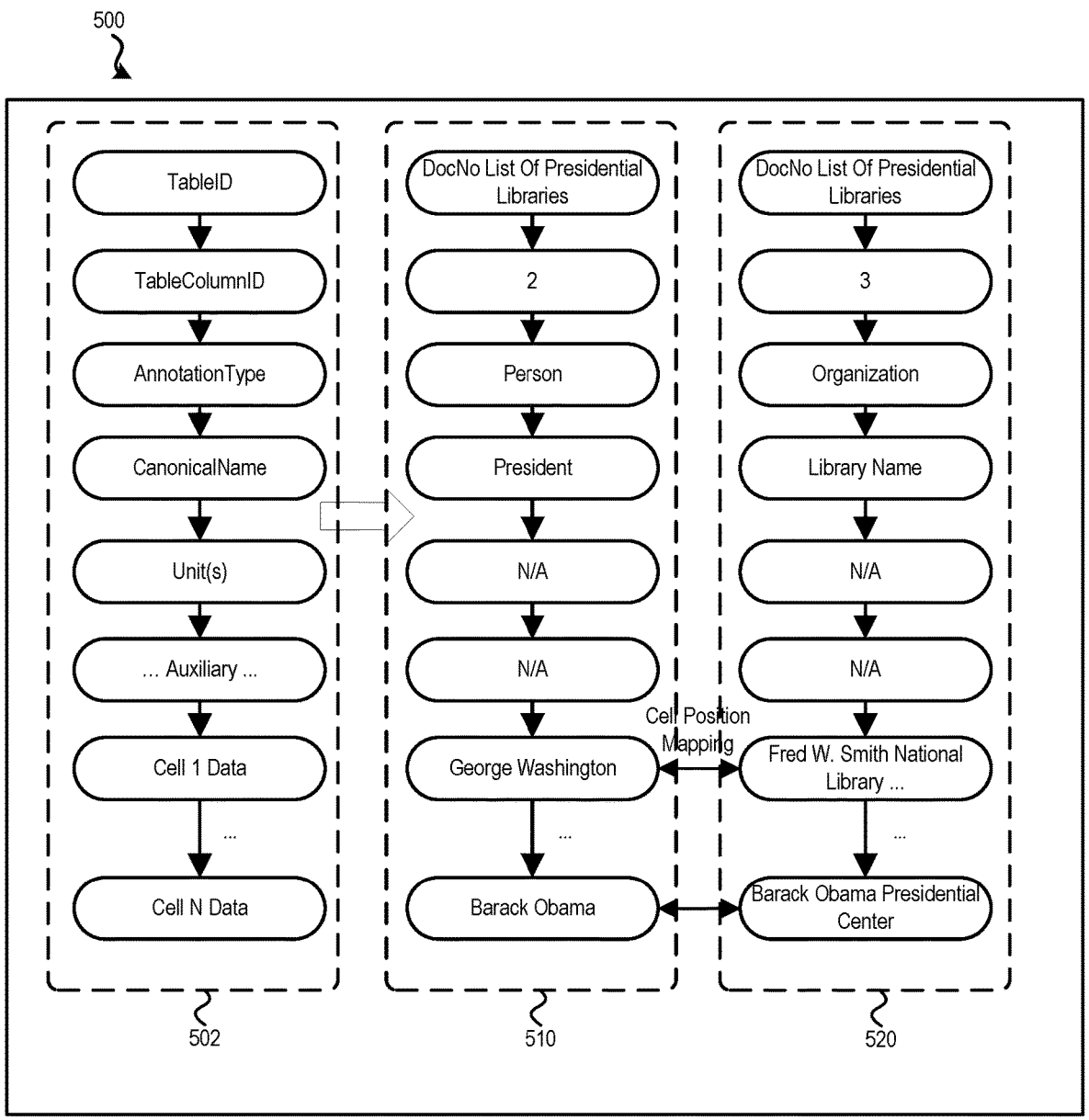
FIG. 5 is a schematic diagram illustrating a table annotations in which a looping cells position mapping and folding method can be applied to determine an answer in accordance with an embodiment of the present disclosure.

FIG. 5 is a schematic diagram illustrating a table annotations 500 in which a looping cells position mapping and folding method can be applied to determine an answer in accordance with an embodiment of the present disclosure. The looping cells position mapping and folding method can be performed as part of the QA system 400 as described in FIG. 4. In the depicted embodiment, the table annotations 500 illustrate generic table annotations 502 for a database, as described in FIG. 2, for a presidential library table that is included in a Presidential Library Wikipedia page (https://en.wikipedia.org/wiki/Presidential_library).

The table annotations 500 also depicts the specific table annotations for the columns 2 (table annotation 510) and column 3 (table annotation 520) of the presidential library table. The presidential library table has the following column headers: "No.", "President", "Library name", "Location", Operated By", "Image", and "Logo/Website." The table annotation 510 has a TableID of DocNo list of presidential libraries, TableColumnID is 2 for the second column, AnnotationType is Person, CanonicalName is President, there is no Unit(s) or Auxiliary data associated with this column, Cell 1 Data for column 2 is George Washington, [remaining cell data from cell 2 to cell N−1 for column 2], and Cell N Data for column 2 is Barack Obama. The table annotation 520 has a TableID of DocNo list of presidential libraries, TableColumnID is 3 for the third column, AnnotationType is Organization, CanonicalName is Library name, there is no Unit(s) or Auxiliary data associated with this column, Cell 1 Data for column 3 is Fred W. Smith national library, [remaining cell data from cell 2 to cell N−1 for column 3], and Cell N Data is Barack Obama Presidential center for column 3.

To answer a question about a Presidential Library for a particular President (e.g., "What is the name of Presidential Library of President Lincoln?), the looping cells position mapping and folding method starts with one table annotation (e.g., table annotation 510) and loops through each cell data until it finds the match that was part of the keynote words search (e.g., Lincoln). The looping cells position mapping and folding method records the cell position number of the cell matching the keynote words search. The looping cells position mapping and folding method then retrieves data in the corresponding cell position from the table annotation for the column containing the Presidential Library name (table annotation 520) to identify the answer. The looping cells position mapping and folding method does not require that the entire table data be search or retrieved. Instead, the looping cells position mapping and folding method only performs searching using one table annotation at a time thus conserving resources and increasing search efficiency.

The folding step of the looping cells position mapping and folding method occurs when more than two table annotations are present. For example, assume the question is "What US Presidents were Democrats and what Libraries did they create?" To answer the question, the looping cells position mapping and folding method begins by looping through the table annotations for the "President" column, and then checking each President's corresponding Party affiliation from a second table annotation for the "Party" affiliation column using the cell position matching the "President" column, as well as the "Library name" column using the third table annotation (assuming there is a table with all these columns) for the same cell position number. In an embodiment, if the "Party" affiliation column indicates that the President is a Democrat and the "Library name" column indicates a library name, then all three cells data for President, Party, and Library are added to a list. The looping cells position mapping and folding method repeats until exhausting the table; then returns the 3-fold list as the answer. Once the cell position is determined, additional data from other columns in the table can be added one column at a time to answer even more complex questions. As an analogy, the looping cells position mapping and folding method can be visualized as opening a hand-held folding fan one section at a time, where the head/pivot of the fan is the TableID, the stick is the HeaderID, the Leaf/Rib is the Cell No. X, and the answer is the Leaf/Rib (Cell No.) level.

Figure 6:
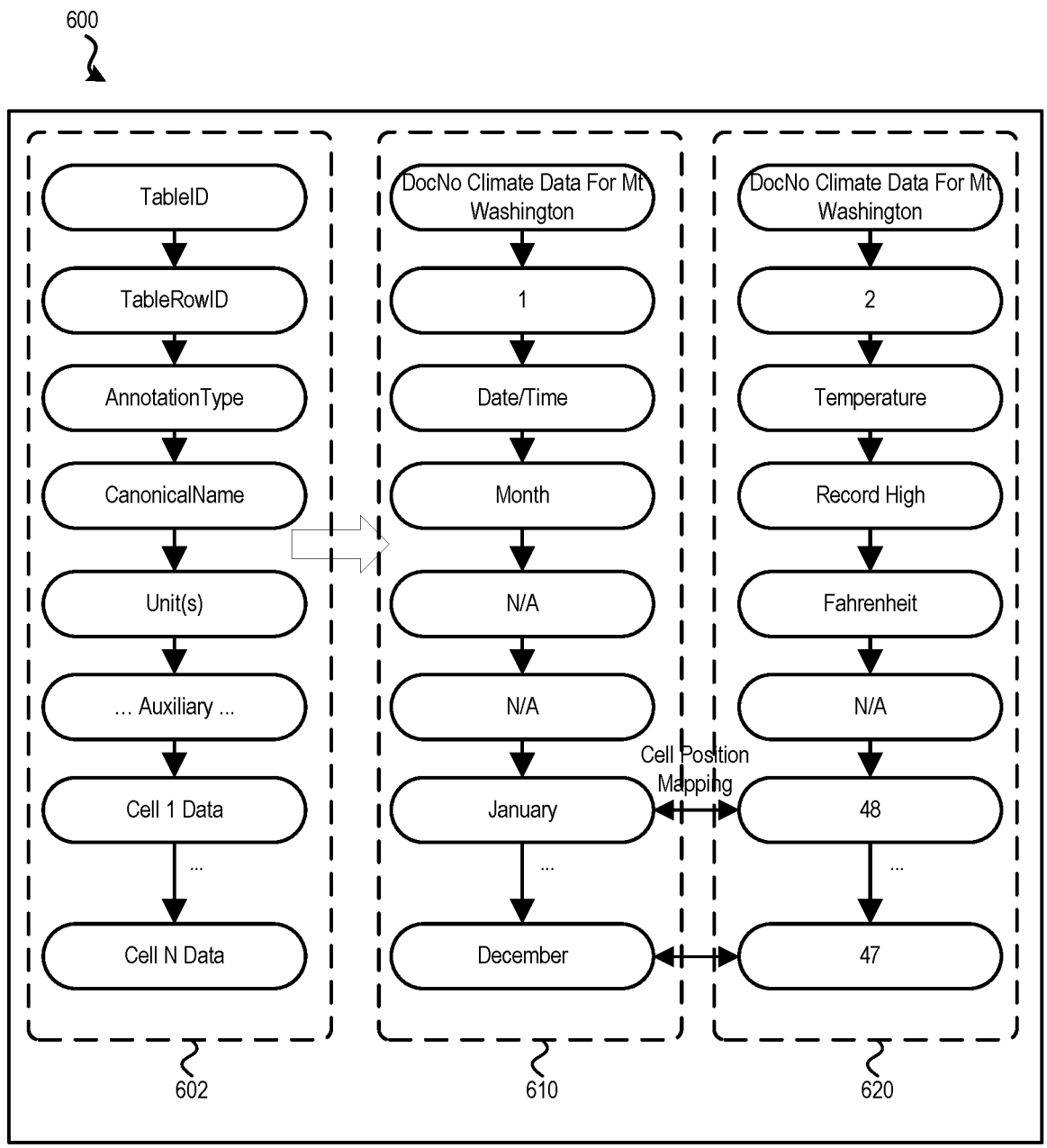
FIG. 6 is a schematic diagram illustrating a second example of a table annotations in which a looping cells position mapping and folding method can be applied to determine an answer in accordance with an embodiment of the present disclosure.

FIG. 6 is a schematic diagram illustrating a second example of a table annotations 600 in which a looping cells position mapping and folding method can be applied to determine an answer in accordance with an embodiment of the present disclosure. The looping cells position mapping and folding method can be performed as part of the QA system 400 as described in FIG. 4. In the depicted embodiment, the table annotations 600 illustrate generic table annotations 602 for a database, as described in FIG. 2, for a Wikipedia Alpine Climate table that is included in a Wikipedia Alpine Climate table (https://en.wikipedia.org/wiki/Alpine_climate).

The table annotations 600 also depicts the specific table annotations for row 1 (table annotation 610) and row 2 (table annotation 620) of the Wikipedia Alpine Climate table. The table annotation 610 has a TableID of DocNo Climate data for Mt Washington, TableRowID is 2 for the second row, AnnotationType is Date/Time, CanonicalName is Month, there is no Unit(s) or Auxiliary data associated with this row, Cell 1 Data for row 2 is January, [remaining cell data from cell 2 to cell N−1 for row 2], and Cell N Data for row 2 is December. The table annotation 620 has a TableID of DocNo Climate data for Mt Washington, TableRowID is 2 for the third row, AnnotationType is Temperature, CanonicalName is Record High, the Unit(s) is Fahrenheit, there is no Auxiliary data associated with this row, Cell 1 Data for row 2 is 48, [remaining cell data from cell 2 to cell N−1 for row 2], and Cell N Data is 47 for row 2.

To answer the question "Which month or months have the record high temperature on Mt. Washington?", the looping cells position mapping and folding method starts by looping from each cell data of the Record High/Temperature Table Annotation 620, and recording at each step the highest temperature. The looping cells position mapping and folding method then uses the cell positions (corresponding to the record high temperature cell position) to retrieve the answer(s) from the Month Table Annotation 610.

In various embodiments, the looping cells position mapping and folding method (as described above in FIG. 5 and FIG. 6) requires that a normalized (standard) cell position is maintained within the table. For example, in one implementation, the cells data are kept in order for its corresponding header (column or row). Alternatively, in some embodiments, a normalized cell position can be added as an attribute. A normalized position means a standard position taken by the implementation such that the relative position of any cell is maintained within the table.

Figure 7:
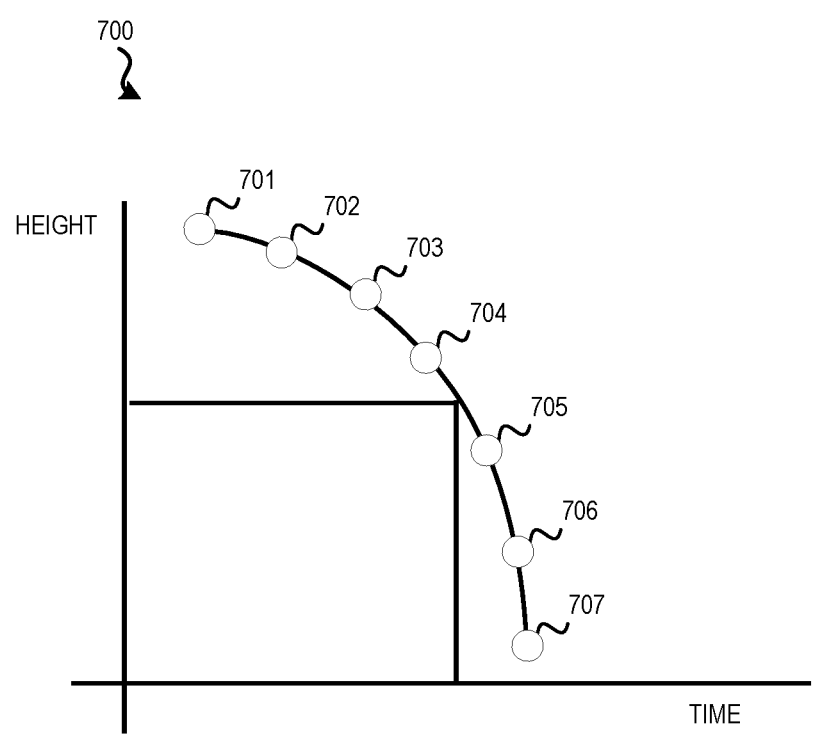
FIG. 7 is graph illustrating a curve fitting with graph axes intersection and folding method in accordance with an embodiment of the present disclosure.

As stated above, the disclosed embodiments may also apply a curve fitting with graph axes intersection and folding method to determine answers that are not directly found in the table data. As an example, FIG. 7 is graph 700 that illustrates a curve fitting with graph axes intersection and folding method in accordance with an embodiment of the present disclosure. In the depicted example, the graph 700 can be used to answer the question "How far does an object fall in the first xx seconds?" In the example, the curve fitting with graph axes intersection and folding method is given a table with seven measurement points 701-707 indicating the height of the object at seven different times in seconds as it falls. The specific xx seconds asked in the question is not in the table data (i.e., not one of the seven measurement points 701-707). Thus, to answer this question, the QA system plots the data cell content value (i.e., measurement points 701-707) against the height of the object (y-axis) and time (x-axis). The QA system can then apply the curve fitting with graph axes intersection and folding method to extract a function, $Y_i=f(X_i)$, based on the given data points. The QA system can then plug in xx (i.e., the specific time referenced in the question) into the function to determine Y (i.e., height of object at time xx) as the answer. Thus, by using the curve fitting with graph axes intersection and folding method, the disclosed embodiments are able to provide answers to questions where the answer is not directly found in the table data or knowledge base.

Additionally, the curve fitting with graph axes intersection and folding method may be used for non-numerical data, such as, but not limited to, the string data presented in the Presidential Libraries table in the above examples. For example, in one embodiment, to apply the curve fitting with graph axes intersection and folding method to non-numerical data, the QA system maps the string to its cell positions. The data cell positions (i.e. numerical values) are then plotted on X and Y axes. The curve fitting method is then applied to determine a function of a function of X and Y, which can then be used to solve for an unknown X or Y value.

Similar to the looping cells position mapping and folding method, the folding step in the curve fitting with graph axes intersection and folding method occurs when more than two table annotations are involved/retrieved. In one embodiment, the curve fitting with graph axes intersection and folding method works with two of the table annotations at a time and uses their result together with the next table annotation. For example, the curve fitting with graph axes intersection and folding method can keep the X axis in place and replace Y axis data with the next table annotations, and then compute the result as described above. The process is repeated for each additional table annotation until all table annotations are consumed, thus folding them one at a time until consumed.

Figure 8:
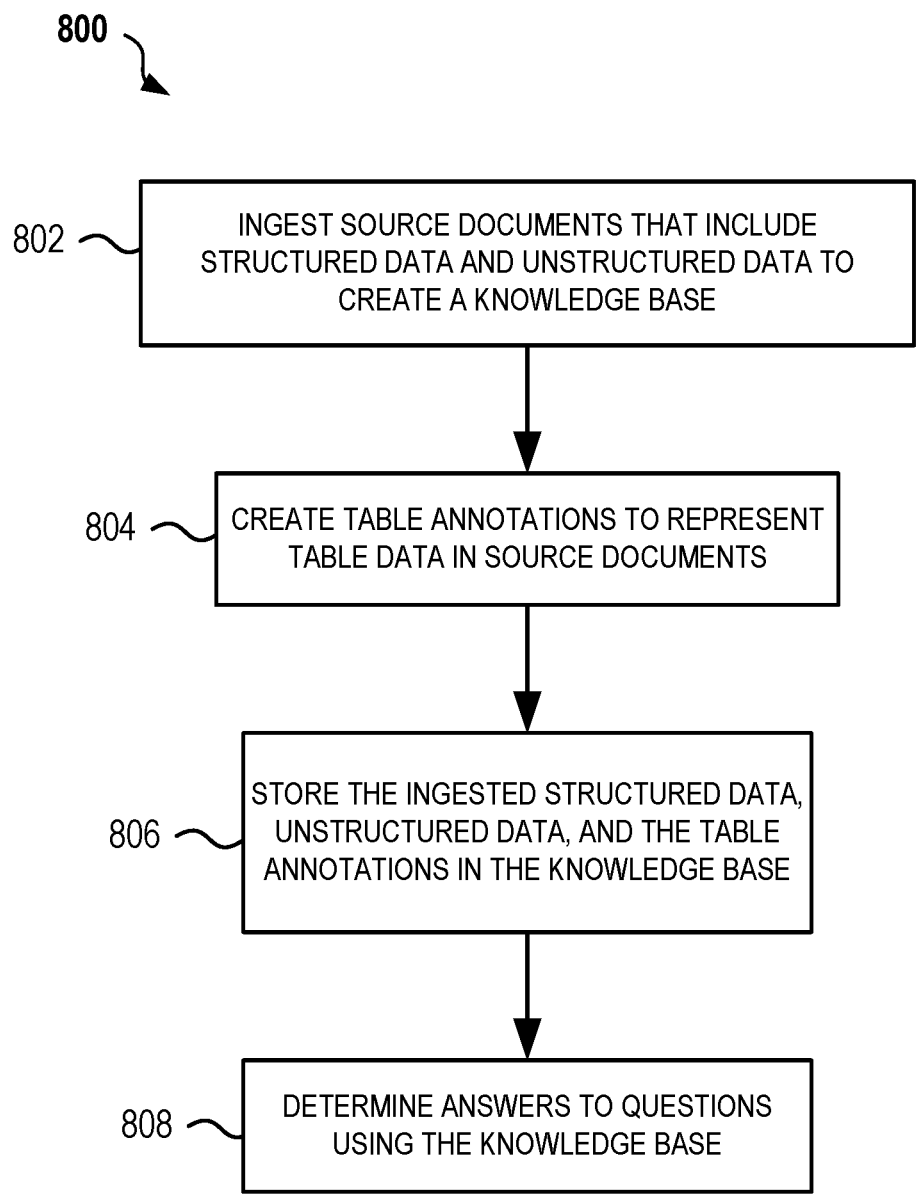
FIG. 8 is a flowchart illustrating a computer-implemented method for utilizing table data in accordance with an embodiment of the present disclosure.

FIG. 8 is a flowchart illustrating a computer-implemented method 800 for utilizing table data in accordance with an embodiment of the present disclosure. The method 800 can be performed by the QA system 400 as described in FIG. 4. The method 800 begins, at step 802, by ingesting source documents that include structured data and unstructured data to create a knowledge base. The unstructured data includes table data. The source documents may be obtained from various sources including a document training database and publicly available online sources.

The method 800, at step 804, creates table annotations to represent the table data found in the source documents. Non-limiting examples of table annotations are depicted in table annotations 200 presented in FIG. 2, and table annotations 300 presented in FIG. 3. As described above, in certain embodiments, creating the table annotations can include extracting the table data found in the source documents; parsing a table structure of a table that is part of the table data found in the source documents to identify table headers and content of table cells of the table; determining annotation types of the table headers; and identifying units of measurement or other auxiliary information associated with the content of the table cells. The table annotations links a table identifier of the table with a table column or row identifier associated with a table column or row of the table, an annotation type of a table header of the table column or row, a canonical name of the table header of the table column or row; and the content of the table cells of the table column or row. As shown in FIG. 2, the content of all the table cells of a table column or row can be linked in a single table annotation. Alternatively, as shown in FIG. 3, the content of the table cells of a table column or row can be each linked in a separate table annotation.

The method 800, at step 806, stores the ingested structured data, unstructured data, and the table annotations in the knowledge base to enable integration of document-level search across structured data with unstructured data into a single information retrieval or QA system.

The method 800, at step 808, determines answers to questions using the knowledge base. In accordance with the disclosed embodiments, the answer may be determined from the table data using at least one of two methods, a looping cells position mapping and folding method, and a curve fitting with graph axes intersection and folding method. As described above, the looping cells position mapping and folding method is configured to loop through each cell data of a first table annotation until a keynote words search match is found, record a cell position number of a cell matching the keynote words search, and retrieve data in a corresponding cell position number from a second table annotation. The looping cells position mapping and folding method can fold in additional table annotations as needed to answer more complex questions. The curve fitting with graph axes intersection and folding method can be used to determine answers that may or may not be directly found in the knowledge base/table data by plotting either a data cell position or a data cell content value to determine a function that is used to determine the answer. The above methods can be combined with the results of a search of the unstructured data in the knowledge base. The disclosed embodiments further enable structured data annotations at the term and position level within a document for passage-level information retrieval. The answer from the structured data consolidates the answer from unstructured data to increase the accuracy of the answer. Additionally, the disclosed embodiments can be configured to return answers in the form of a list or table.

Figure 9:
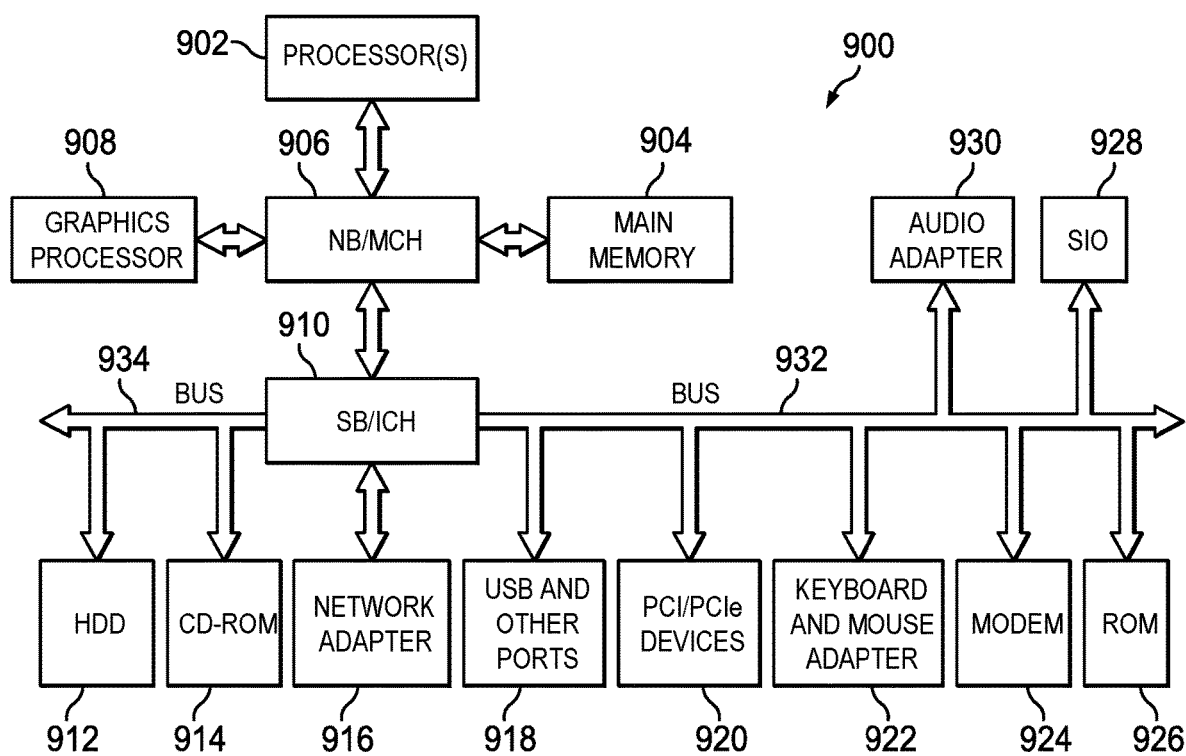
FIG. 9 is a block diagram illustrating a hardware architecture of a system according to an embodiment of the present disclosure.

FIG. 9 is a block diagram illustrating a hardware architecture of a system 900 according to an embodiment of the present disclosure in which aspects of the illustrative embodiments may be implemented. For example, in one embodiment, the QA system 400 may be implemented using the data processing system 900. Additionally, the data processing system 900 may be configured to store and execute instructions for performing the method 800 described in FIG. 8 as well as the other processes described herein. In the depicted example, the data processing system 900 employs a hub architecture including north bridge and memory controller hub (NB/MCH) 906 and south bridge and input/output (I/O) controller hub (SB/ICH) 910. Processor(s) 902, main memory 904, and graphics processor 908 are connected to NB/MCH 906. Graphics processor 908 may be connected to NB/MCH 906 through an accelerated graphics port (AGP). A computer bus, such as bus 932 or bus 934, may be implemented using any type of communication fabric or architecture that provides for a transfer of data between different components or devices attached to the fabric or architecture.

In the depicted example, network adapter 916 connects to SB/ICH 910. Audio adapter 930, keyboard and mouse adapter 922, modem 924, read-only memory (ROM) 926, hard disk drive (HDD) 912, compact disk read-only memory (CD-ROM) drive 914, universal serial bus (USB) ports and other communication ports 918, and peripheral component interconnect/peripheral component interconnect express (PCI/PCIe) devices 920 connect to SB/ICH 910 through bus 932 and bus 934. PCI/PCIe devices may include, for example, Ethernet adapters, add-in cards, and personal computing (PC) cards for notebook computers. PCI uses a card bus controller, while PCIe does not. ROM 926 may be, for example, a flash basic input/output system (BIOS). Modem 924 or network adapter 916 may be used to transmit and receive data over a network.

HDD 912 and CD-ROM drive 914 connect to SB/ICH 910 through bus 934. HDD 912 and CD-ROM drive 914 may use, for example, an integrated drive electronics (IDE) or serial advanced technology attachment (SATA) interface. In some embodiments, HDD 912 may be replaced by other forms of data storage devices including, but not limited to, solid-state drives (SSDs). A super I/O (SIO) device 928 may be connected to SB/ICH 910. SIO device 928 may be a chip on the motherboard that is configured to assist in performing less demanding controller functions for the SB/ICH 910 such as controlling a printer port, controlling a fan, and/or controlling the small light emitting diodes (LEDS) of the data processing system 900.

The data processing system 900 may include a single processor 902 or may include a plurality of processors 902. Additionally, processor(s) 902 may have multiple cores. For example, in one embodiment, data processing system 900 may employ a large number of processors 902 that include hundreds or thousands of processor cores. In some embodiments, the processors 902 may be configured to perform a set of coordinated computations in parallel.

An operating system is executed on the data processing system 900 using the processor(s) 902. The operating system coordinates and provides control of various components within the data processing system 900 in FIG. 9. Various applications and services may run in conjunction with the operating system. Instructions for the operating system, applications, and other data are located on storage devices, such as one or more HDD 912, and may be loaded into main memory 904 for execution by processor(s) 902. In some embodiments, additional instructions or data may be stored on one or more external devices. The processes described herein for the illustrative embodiments may be performed by processor(s) 902 using computer usable program code, which may be located in a memory such as, for example, main memory 904, ROM 926, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented by a question-answering (QA) system, the method comprising:
ingesting source documents that include structured data and unstructured data to create a knowledge base, wherein the unstructured data includes table data;
creating a plurality of table annotations to represent the table data, wherein the plurality of table annotations comprises a table annotation for each column in the table data that links content of all cells in the column together in order from a table identifier to a last cell in the column;
storing the ingested structured data, unstructured data, and the table annotations in the knowledge base; and
determining answers to questions using the knowledge base, wherein determining an answer to a question comprises performing a looping cells position mapping and folding method that loops through each cell data of a first table annotation in the plurality of table annotations until a keynote word search match is found, recording a cell position number of a cell in the first table annotation matching the keynote word search, and retrieving data in a corresponding cell position number from a second table annotation in the plurality of table annotations.

2. The method of claim 1, wherein the answer to the question is not found directly in the knowledge base.

3. The method of claim 1, further comprising:
extracting the table data found in the source documents;
parsing a table structure of a table that is part of the table data found in the source documents to identify table headers and content of table cells of the table; and
determining annotation types of the table headers.

4. The method of claim 1, wherein the looping cells position mapping and folding method further comprises retrieving data in the corresponding cell position number from a third table annotation.

5. The method of claim 2, wherein determining the answer further comprises performing a curve fitting with graph axes intersection and folding method that plots one of a data cell position or a data cell content value to determine a function that is used to determine the answer.

6. The method of claim 3, further comprising identifying units of measurement associated with the content of the table cells.

7. The method of claim 3, wherein the table annotations link the table identifier of the table with a table column identifier associated with a table column of the table, an annotation type of a table header of the table column, a canonical name of the table header of the table column, and the content of the table cells of the table column.

8. The method of claim 3, wherein the table annotations link the table identifier of the table with a table row identifier associated with a table row of the table, an annotation type of a table header of the table row, a canonical name of the table header of the table row, and the content of the table cells of the table row.

9. The method of claim 3, wherein the content of all the table cells of a table row are linked in a single table annotation.

10. The method of claim 3, wherein the content of the table cells of a table row are each linked in a separate table annotation.

11. A question answering (QA) system comprising memory for storing instructions, and a processor configured to execute the instructions to:
ingest source documents that include structured data and unstructured data to create a knowledge base, wherein the unstructured data includes table data;
create a plurality of table annotations to represent the table data, wherein the plurality of table annotations comprises a table annotation for each column in the table data that links content of all cells in the column together in order from a table identifier to a last cell in the column;
store the ingested structured data, unstructured data, and the table annotations in the knowledge base; and
determine answers to questions using the knowledge base, wherein determining an answer to a question comprises performing a looping cells position mapping and folding method that loops through each cell data of a first table annotation in the plurality of table annotations until a keynote word search match is found, recording a cell position number of a cell in the first table annotation matching the keynote word search, and retrieving data in a corresponding cell position number from a second table annotation in the plurality of table annotations.

12. The QA system of claim 11, wherein when an answer to a question is not found directly in the knowledge base, the processor is configured to further execute the instructions to determine the answer by performing a curve fitting with graph axes intersection and folding method that plots one of a data cell position or a data cell content value to determine a function that is used to determine the answer.

13. The QA system of claim 11, wherein the creating table annotations to represent the table data comprises:
extracting the table data found in the source documents;
parsing a table structure of a table that is part of the table data found in the source documents to identify table headers and content of table cells of the table;
determining annotation types of the table headers; and
identifying units of measurement associated with the content of the table cells.

14. The QA system of claim 11, wherein the table annotations link the table identifier of the table with a table column identifier associated with a table column of the table, an annotation type of a table header of the table column, a canonical name of the table header of the table column, and the content of the cells of the table column.

15. A computer program product for utilizing table data in a question answering (QA) system, the computer program product comprising a computer readable storage medium having program instructions embodied therewith, the program instructions executable by a processor to cause the processor to:
ingest source documents that include structured data and unstructured data to create a knowledge base, wherein the unstructured data includes table data;
extract the table data found in the source documents;
parse a table structure of a table that is part of the table data found in the source documents to identify table headers and content of table cells of the table;
determine annotation types of the table headers;
create a plurality of table annotations to represent the table data, wherein the plurality of table annotations comprises a table annotation for each column in the table data that links content of all cells in the column together in order from a table identifier to a last cell in the column;
store the ingested structured data, unstructured data, and the table annotations in the knowledge base; and
determine answers to questions using the knowledge base, wherein the program instructions for determining an answer comprises performing a looping cells position mapping and folding method that loops through each cell data of a first table annotation in the plurality of table annotations until a keynote word search match is found, recording a cell position number of a cell in the first table annotation matching the keynote word search, and retrieving data in a corresponding cell position number from at least one additional table annotation in the plurality of table annotations.

16. The computer program product of claim 15, wherein the program instructions for determining an answer further comprises:
a curve fitting with graph axes intersection and folding method that plots one of a data cell position or a data cell content value to determine a function that is used to determine the answer.

17. The computer program product of claim 15, wherein the looping cells position mapping and folding method further comprises retrieving data in a corresponding cell position number from a third table annotation.

18. The computer program product of claim 15, wherein the program instructions comprise instructions to identify units of measurement associated with the content of the table cells.

* * * * *